US012812579B2

(12) United States Patent
Zou et al.

(10) Patent No.: US 12,812,579 B2
(45) Date of Patent: Nov. 24, 2026

(54) PROPAGATION DELAY COMPENSATION

(71) Applicant: Telefonaktiebolaget LM Ericsson (publ), Stockholm (SE)

(72) Inventors: Zhenhua Zou, Solna (SE); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 404 days.

(21) Appl. No.: 18/032,113

(22) PCT Filed: Oct. 8, 2021

(86) PCT No.: PCT/EP2021/077940
§ 371 (c)(1),
(2) Date: Apr. 14, 2023

(87) PCT Pub. No.: WO2022/078912
PCT Pub. Date: Apr. 21, 2022

(65) Prior Publication Data

US 2023/0388953 A1 Nov. 30, 2023

Related U.S. Application Data

(60) Provisional application No. 63/092,723, filed on Oct. 16, 2020.

(51) Int. Cl.
*H04W 56/00* (2009.01)
*H04L 5/00* (2006.01)
*H04W 24/10* (2009.01)

(52) U.S. Cl.
CPC ......... *H04W 56/005* (2013.01); *H04L 5/0048* (2013.01); *H04W 24/10* (2013.01)

(58) Field of Classification Search
CPC ............... H04W 56/005; H04W 24/10; H04W 56/0015; H04L 5/0048
See application file for complete search history.

(56) References Cited

U.S. PATENT DOCUMENTS

2007/0115842 A1* 5/2007 Matsuda ............. H04W 56/006 370/252
2010/0178940 A1* 7/2010 Mcaleenan .......... H04J 11/0069 455/456.5

(Continued)

FOREIGN PATENT DOCUMENTS

EP 3648496 A1 * 5/2020 ............ H04W 16/28
WO WO-2020153892 A1 * 7/2020 ............ H04W 64/20
WO WO-2020164512 A1 * 8/2020 ........... G01S 13/878

OTHER PUBLICATIONS

International Search Report and Written Opinion dated Jan. 7, 2022 issued in International Patent Application No. PCT/EP2021/077940 (11 pages).

(Continued)

*Primary Examiner* — Noel R Beharry
*Assistant Examiner* — Phillip J Kearns
(74) *Attorney, Agent, or Firm* — Rothwell, Figg, Ernst & Manbeck, P.C.

(57) ABSTRACT

A method (300) performed by a UE. The method includes the UE receiving a message transmitted by a network node, the message comprising RTT based measurement information and at least one measurement reporting configuration. The UE also performs at least one of: i) transmitting to the network node a first time difference report in accordance with the measurement reporting configuration, wherein the first time difference report transmitted by the UE comprises a first time difference measurement result, or ii) receiving a second time difference report transmitted by the network node, wherein the second time difference report transmitted by the network node comprises a second time difference measurement result.

12 Claims, 6 Drawing Sheets

(56) References Cited

U.S. PATENT DOCUMENTS

| | | | | |
|---|---|---|---|---|
| 2016/0210633 | A1* | 7/2016 | Epelman | G06Q 20/3224 |
| 2017/0059701 | A1* | 3/2017 | Oh | G01S 13/765 |
| 2017/0250781 | A1* | 8/2017 | Golitschek Edler Von Elbwart | H04L 1/0026 |
| 2021/0373148 | A1* | 12/2021 | Chen | G01S 13/765 |
| 2023/0276421 | A1* | 8/2023 | Yang | H04W 24/08 370/329 |

OTHER PUBLICATIONS

CATT, “Ue and gNB measurements for NR Positioning”, R1-1906307, 3GPP TSG RAN WG1 #97, Reno, USA, May 13-17, 2019, XP051727757 (11 pages).

* cited by examiner

PROPAGATION DELAY COMPENSATION

CROSS REFERENCE TO RELATED APPLICATIONS

This application is a 35 U.S.C. § 371 National Stage of International Patent Application No. PCT/EP2021/077940, filed Oct. 8, 2021, which claims priority to U.S. provisional application No. 63/092,723, filed on Oct. 16, 2020, which is incorporated by this reference.

TECHNICAL FIELD

Disclosed are embodiments related to propagation delay compensation.

BACKGROUND

1. Current 3GPP Status

The 3GPP Rel-17 RAN work item "Enhanced Industrial Internet of Things (IoT) and ultra-reliable and low latency communication (URLLC) support for NR" has the following objective related with propagation delay compensation: "Enhancements for support of time synchronization: a. RAN impacts of SA2 work on uplink time synchronization for TSN, if any. [RAN2]; b. Propagation delay compensation enhancements (including mobility issues, if any). [RAN2, RAN1, RAN3, RAN4]."

RAN1 has agreed in RAN1#102e that

| |
|---|
| The following options for propagation delay compensation are further studied in RAN1<br>Option 1: TA-based propagation delay<br>Option 1a: Propagation delay estimation based on legacy Timing advance (potentially with enhanced TA indication granularity).<br>Option 1b: Propagation delay estimation based on timing advanced enhanced for time synchronization (as 1a but with updated RAN4 requirements to TA adjustment error and Te)<br>Option 1c: Propagation delay estimation based on a new dedicated signaling with finer delay compensation granularity (Separated signaling from TA so that TA procedure is not affected)<br>Option 2: RTT based delay compensation:<br>Propagation delay estimation based on an RAN managed Rx-Tx procedure intended for time synchronization (FFS to expand or separate procedure/signaling to positioning). |

The reference cell for reference time delivery is the Primary Cell (PCell). The reference time information sent on Radio Resource Control (RRC) contains a field that indicates the reference System Frame Number (SFN) corresponding to the reference time information. It is possible to have unaligned SFN across carriers in a cell group, and thus a reference cell is needed and defined in RRC that "If referenceTimeInfo field is received in DLInformationTransfer message, this field indicates the SFN of PCell." PSCell is not included as DLInformationTransfer is sent on SRB1/2 on the Master Cell Group (MCG) not on the Secondary Cell Group (SCG). Additionally, System Information Block 9 (SIB9) is only broadcasted on the PCell and this restriction aligns the RRC-dedicated and broadcast message for reference time delivery.

2. Multi-RTT Positioning Method

In the Multi-RTT positioning method, the UE position is estimated based on measurements performed at both, UE and TRPs. The measurements performed at the UE and TRPs are UE/gNB Rx−Tx time difference measurements (and optionally DL-PRS-RSRP and UL-SRS-RSRP) of DL-PRS and UL-SRS, which are used by an LMF to determine the RTTs.

In what below, we show an example of New Radio (NR) base station (gNB) measurement for positioning.

The reporting range of gNB Rx−Tx time difference, as defined in Clause 5.2.3 of TS 38.215, is defined from $-985024T_c$ to $+985024\times T_c$. The reporting resolution is uniform across the reporting range and is defined as $T=T_c*2^k$ where k is selected by gNB from the set {0, 1, 2, 3, 4, 5}.

LMF (Location Management Function) provides a recommended k value (k1). gNB selects parameter k (k2) and informs to the LMF.

The mapping of measured quantity for each reporting resolution (k) is defined in Table 13.2.1-1 to Table 13.2.1-6 of 3GPP TS 38.133 V16.4.0, which are shown below.

TABLE 13.2.1-1 gNB Rx-Tx time difference measurement report mapping for reporting resolution of $T_c$ (k = 0)

| Reported Value | Measured Quantity Value | Unit |
|---|---|---|
| RX-TX_0000 | −985024 > RX-TX | $T_c$ |
| RX-TX_0001 | −985024 ≤ RX-TX < −985023 | $T_c$ |
| RX-TX_0002 | −985023 ≤ RX-TX < −985022 | $T_c$ |
| . . . | . . . | . . . |
| RX-TX_985023 | −2 ≤ RX-TX < −1 | $T_c$ |
| RX-TX_985024 | −1 ≤ RX-TX ≤ 0 | $T_c$ |
| RX-TX_985025 | 0 < RX-TX ≤ 1 | $T_c$ |
| RX-TX_985026 | 1 < RX-TX ≤ 2 | $T_c$ |
| RX-TX_985027 | 2 < RX-TX ≤ 3 | $T_c$ |
| . . . | . . . | . . . |
| RX-TX_1970048 | 985023 < RX-TX ≤ 985024 | $T_c$ |
| RX-TX_1970049 | 985024 < RX-TX | $T_c$ |

TABLE 13.2.1-2 gNB Rx-Tx time difference measurement report mapping for reporting resolution of $2T_c$ (k = 1)

| Reported Value | Measured Quantity Value | Unit |
|---|---|---|
| RX-TX_0000 | −985024 > RX-TX | $T_c$ |
| RX-TX_0001 | −985024 ≤ RX-TX < −985022 | $T_c$ |
| RX-TX_0002 | −985022 ≤ RX-TX < −985020 | $T_c$ |
| . . . | . . . | . . . |
| RX-TX_492511 | −4 ≤ RX-TX < −2 | $T_c$ |
| RX-TX_492512 | −2 ≤ RX-TX ≤ 0 | $T_c$ |
| RX-TX_492513 | 0 < RX-TX ≤ 2 | $T_c$ |
| RX-TX_492514 | 2 < RX-TX ≤ 4 | $T_c$ |

TABLE 13.2.1-2-continued gNB Rx-Tx time difference measurement report mapping for reporting resolution of $2T_c$ (k = 1)

| Reported Value | Measured Quantity Value | Unit |
|---|---|---|
| RX-TX_492515 | 4 < RX-TX ≤ 6 | $T_c$ |
| . . . | . . . | . . . |
| RX-TX_985024 | 985022 < RX-TX ≤ 985024 | $T_c$ |
| RX-TX_985025 | 985024 < RX-TX | $T_c$ |

TABLE 13.2.1-3 gNB Rx-Tx time difference measurement report mapping for reporting resolution of $4T_c$ (k = 2)

| Reported Value | Measured Quantity Value | Unit |
|---|---|---|
| RX-TX_0000 | −985024 > RX-TX | $T_c$ |
| RX-TX_0001 | −985024 ≤ RX-TX < −985020 | $T_c$ |
| RX-TX_0002 | −985020 ≤ RX-TX < −985018 | $T_c$ |
| . . . | . . . | . . . |
| RX-TX_246255 | −8 ≤ RX-TX < −4 | $T_c$ |
| RX-TX_246256 | −4 ≤ RX-TX ≤ 0 | $T_c$ |
| RX-TX_246257 | 0 < RX-TX ≤ 4 | $T_c$ |
| RX-TX_246258 | 4 < RX-TX ≤ 8 | $T_c$ |
| RX-TX_246259 | 8 < RX-TX ≤ 12 | $T_c$ |
| . . . | . . . | . . . |
| RX-TX_492512 | 985020 < RX-TX ≤ 985024 | $T_c$ |
| RX-TX_492513 | 985024 < RX-TX | $T_c$ |

TABLE 13.2.1-4 gNB Rx-Tx time difference measurement report mapping for reporting resolution of $8T_c$ (k = 3)

| Reported Value | Measured Quantity Value | Unit |
|---|---|---|
| RX-TX_0000 | −985024 > RX-TX | $T_c$ |
| RX-TX_0001 | −985024 ≤ RX-TX < −985016 | $T_c$ |
| RX-TX_0002 | −985016 ≤ RX-TX < −985008 | $T_c$ |
| . . . | . . . | . . . |
| RX-TX_123127 | −16 ≤ RX-TX < −8 | $T_c$ |
| RX-TX_123128 | −8 ≤ RX-TX ≤ 0 | $T_c$ |
| RX-TX_123129 | 0 < RX-TX ≤ 8 | $T_c$ |
| RX-TX_123130 | 8 < RX-TX ≤ 16 | $T_c$ |
| RX-TX_123131 | 16 < RX-TX ≤ 24 | $T_c$ |
| . . . | . . . | . . . |
| RX-TX_246256 | 985016 < RX-TX ≤ 985024 | $T_c$ |
| RX-TX_246257 | 985024 < RX-TX | $T_c$ |

TABLE 13.2.1-5 gNB Rx-Tx time difference measurement report mapping for reporting resolution of $16T_c$ (k = 4)

| Reported Value | Measured Quantity Value | Unit |
|---|---|---|
| RX-TX_0000 | −985024 > RX-TX | $T_c$ |
| RX-TX_0001 | −985024 ≤ RX-TX < −985008 | $T_c$ |
| RX-TX_0002 | −985008 ≤ RX-TX < −984992 | $T_c$ |
| . . . | . . . | . . . |
| RX-TX_61563 | −32 ≤ RX-TX < −16 | $T_c$ |
| RX-TX_61564 | −16 ≤ RX-TX ≤ 0 | $T_c$ |
| RX-TX_61565 | 0 < RX-TX ≤ 16 | $T_c$ |
| RX-TX_61566 | 16 < RX-TX ≤ 32 | $T_c$ |
| RX-TX_61567 | 32 < RX-TX ≤ 48 | $T_c$ |
| . . . | . . . | . . . |
| RX-TX_123128 | 985008 < RX-TX ≤ 985024 | $T_c$ |
| RX-TX_123129 | 985024 < RX-TX | $T_c$ |

TABLE 13.2.1-6 gNB Rx-Tx time difference measurement report mapping for reporting resolution of $32T_c$ (k = 5)

| Reported Value | Measured Quantity Value | Unit |
|---|---|---|
| RX-TX_0000 | −985024 > RX-TX | $T_c$ |
| RX-TX_0001 | −985024 ≤ RX-TX < −984992 | $T_c$ |
| RX-TX_0002 | −984992 ≤ RX-TX < −984960 | $T_c$ |
| . . . | . . . | . . . |
| RX-TX_30781 | −64 ≤ RX-TX < −32 | $T_c$ |
| RX-TX_30782 | −32 ≤ RX-TX ≤ 0 | $T_c$ |
| RX-TX_30783 | 0 < RX-TX ≤ 32 | $T_c$ |
| RX-TX_30784 | 32 < RX-TX ≤ 64 | $T_c$ |
| RX-TX_30785 | 64 < RX-TX ≤ 96 | $T_c$ |
| . . . | . . . | . . . |
| RX-TX_61564 | 984992 < RX-TX ≤ 985024 | $T_c$ |
| RX-TX_61565 | 985024 < RX-TX | $T_c$ |

3. Report Mapping

The reporting range of UL SRS RSRP, as defined in clause 5.2.5 of 38.215, is defined from −156 dBm to −31 dBm with resolution 1 dB. The mapping of measured quantity is defined in Table 13.3.1-1 of TS 38.133 (which is shown below). The range in the signalling may be larger than the guaranteed accuracy range.

TABLE 13.3.1-1

UL SRS RSRP report mapping

| Reported value | Measured quantity value | Unit |
|---|---|---|
| SRS_RSRP_0 | SRS-RSRP < −156 | dBm |
| SRS_RSRP_1 | −156 ≤ SRS-RSRP < −155 | dBm |
| SRS_RSRP_2 | −155 ≤ SRS-RSRP < −154 | dBm |
| SRS_RSRP_3 | −154 ≤ SRS-RSRP < −153 | dBm |
| SRS_RSRP_4 | −153 ≤ SRS-RSRP < −152 | dBm |
| SRS_RSRP_5 | −152 ≤ SRS-RSRP < −151 | dBm |
| SRS_RSRP_6 | −151 ≤ SRS-RSRP < −150 | dBm |
| SRS_RSRP_7 | −150 ≤ SRS-RSRP < −149 | dBm |
| SRS_RSRP_8 | −149 ≤ SRS-RSRP < −148 | dBm |
| SRS_RSRP_9 | −148 ≤ SRS-RSRP < −147 | dBm |
| SRS_RSRP_10 | −147 ≤ SRS-RSRP < −146 | dBm |
| SRS_RSRP_11 | −146 ≤ SRS-RSRP < −145 | dBm |
| SRS_RSRP_12 | −145 ≤ SRS-RSRP < −144 | dBm |
| SRS_RSRP_13 | −144 ≤ SRS-RSRP < −143 | dBm |
| SRS_RSRP_14 | −143 ≤ SRS-RSRP < −142 | dBm |
| SRS_RSRP_15 | −142 ≤ SRS-RSRP < −141 | dBm |
| SRS_RSRP_16 | −141 ≤ SRS-RSRP < −140 | dBm |
| SRS_RSRP_17 | −140 ≤ SRS-RSRP < −139 | dBm |
| SRS_RSRP_18 | −139 ≤ SRS-RSRP < −138 | dBm |
| . . . | . . . | . . . |
| SRS_RSRP_111 | −46 ≤ SRS-RSRP < −45 | dBm |
| SRS_RSRP_112 | −45 ≤ SRS-RSRP < −44 | dBm |
| SRS_RSRP_113 | −44 ≤ SRS-RSRP < −43 | dBm |
| SRS_RSRP_114 | −43 ≤ SRS-RSRP < −42 | dBm |
| SRS_RSRP_115 | −42 ≤ SRS-RSRP < −41 | dBm |
| SRS_RSRP_116 | −41 ≤ SRS-RSRP < −40 | dBm |
| SRS_RSRP_117 | −40 ≤ SRS-RSRP < −39 | dBm |
| SRS_RSRP_118 | −39 ≤ SRS-RSRP < −38 | dBm |
| SRS_RSRP_119 | −38 ≤ SRS-RSRP < −37 | dBm |
| SRS_RSRP_120 | −37 ≤ SRS-RSRP < −36 | dBm |
| SRS_RSRP_121 | −36 ≤ SRS-RSRP < −35 | dBm |
| SRS_RSRP_122 | −35 ≤ SRS-RSRP < −34 | dBm |
| SRS_RSRP_123 | −34 ≤ SRS-RSRP < −33 | dBm |
| SRS_RSRP_124 | −33 ≤ SRS-RSRP < −32 | dBm |
| SRS_RSRP_125 | −32 ≤ SRS-RSRP < −31 | dBm |
| SRS_RSRP_126 | −31 ≤ SRS-RSRP | dBm |

SUMMARY

Certain challenges presently exist. For instance, although the principle of the propagation delay compensation method is the same as the Timing Advance (TA) for uplink timing alignment and Round-Trip-Time (RTT) for positioning, the signalling details to support those two approaches (i.e., TA and RTT) on the Access Stratum (AS) layer are missing.

Accordingly, in one aspect this disclosure provides a method performed by a UE. The method includes the UE receiving a message transmitted by a network node, the message comprising RTT based measurement information and at least one measurement reporting configuration. The UE also performs at least one of: i) transmitting to the network node a first time difference report in accordance with the measurement reporting configuration, wherein the first time difference report transmitted by the UE comprises a first time difference measurement result, or ii) receiving a second time difference report transmitted by the network node, wherein the second time difference report transmitted by the network node comprises a second time difference measurement result.

In another aspect there is provided a computer program comprising instructions which when executed by processing circuitry of a UE, causes the UE to perform the UE methods disclosed herein. In another aspect there is provided a carrier containing the computer program, wherein the carrier is one of an electronic signal, an optical signal, a radio signal, and a computer readable storage medium.

In another aspect there is provided a UE where the UE is configured to perform the UE methods disclosed herein. In some embodiments, the UE includes processing circuitry and a memory containing instructions executable by the processing circuitry, whereby the UE is configured to perform the UE methods disclosed herein.

In another aspect there is a method performed by a network node (e.g., a base station). The method includes the network node transmitting to a UE a message comprising RTT based measurement information and at least one measurement reporting configuration. The network node also performs at least one of: i) receiving a first time difference report transmitted by the UE in accordance with the measurement reporting configuration, wherein the first time difference report transmitted by the UE comprises a first time difference measurement result, or ii) transmitting to the UE a second time difference report, wherein the second time difference report transmitted by the network node comprises a second time difference measurement result.

In another aspect there is provided a computer program comprising instructions which when executed by processing circuitry of a network node, causes the network node to perform the network node methods disclosed herein. In another aspect there is provided a carrier containing the computer program, wherein the carrier is one of an electronic signal, an optical signal, a radio signal, and a computer readable storage medium.

In another aspect there is provided a network node where the network node is configured to perform the network node methods disclosed herein. In some embodiments, the network node includes processing circuitry and a memory containing instructions executable by the processing circuitry, whereby the network node is configured to perform the network node methods disclosed herein.

Advantages of the embodiments is that they enable a UE and/or network node to compensate for propagation delays.

BRIEF DESCRIPTION OF THE DRAWINGS

The accompanying drawings, which are incorporated herein and form part of the specification, illustrate various embodiments.

DETAILED DESCRIPTION

The legacy multi-RTT positioning method makes use of the UE Rx-Tx time difference measurements and Downlink (DL) Positioning Reference Signal (PRS) Reference Signal Received Power (RSRP) of downlink signals received from multiple TRPs measured by the UE, and the measured gNB Rx−Tx time difference measurements and UL-SRS-RSRP at multiple TRPs of uplink signals transmitted from UE. The measurements are used to determine the RTT at the positioning server which are used to estimate the location of the UE.

Figure 1:
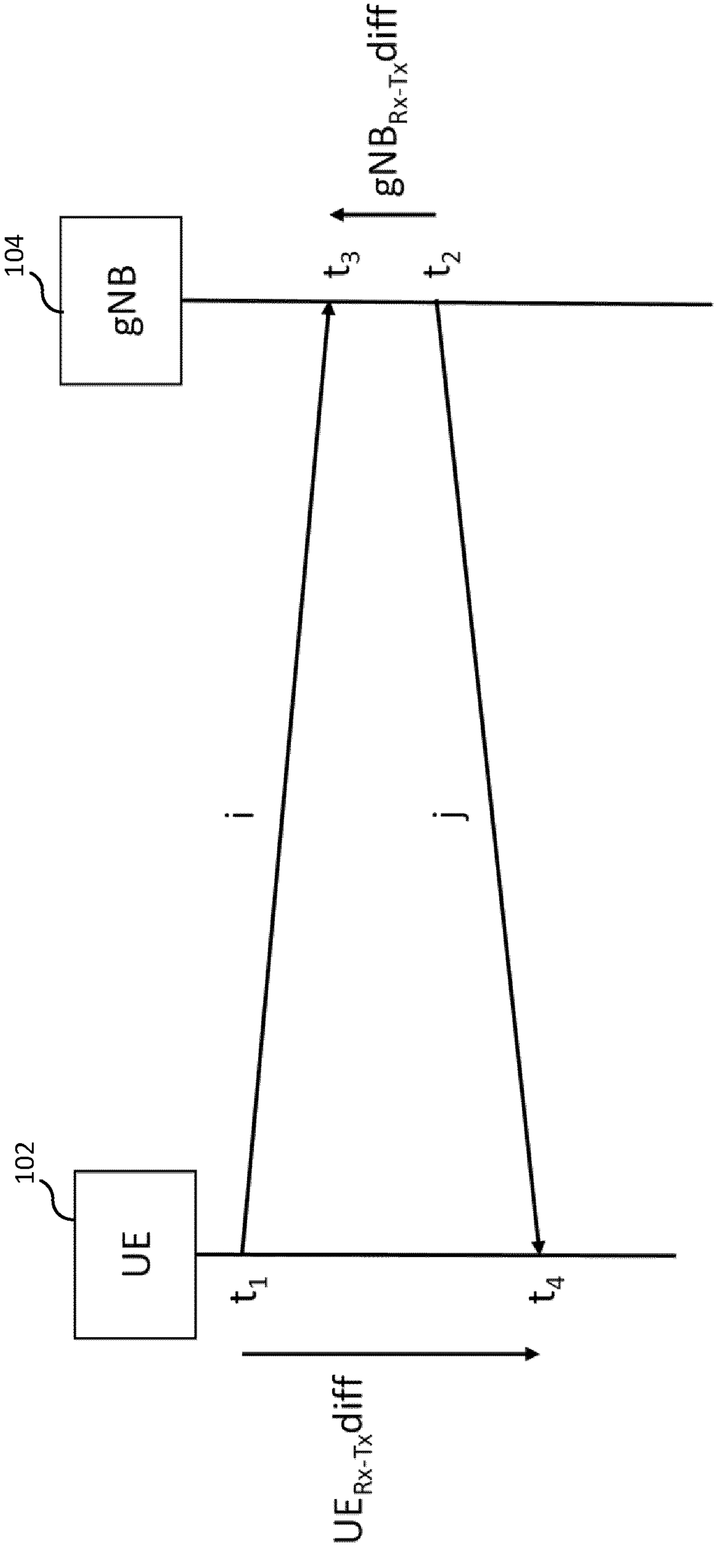
FIG. 1 is a message flow diagram illustrating a process for determining RTT.

The RTT based delay compensation is leveraged on the legacy multi-RTT positioning method illustrated in FIG. 1. As shown in FIG. 1, a user equipment (UE) 102 (which can be any device capable of wirelessly communicating with a network node 104 (e.g. base station)) transmits an uplink frame i and records the transmission time as $t_1$. The network node 104 (e.g. a base station such as a 5G base station (gNB)) receives uplink frame i and records the time of arrival of the first detected path as $t_3$. Herein the term network node will be abbreviated "gNB," but the disclosure is not limited to the network node 104 being a 5G base station.

Next, the gNB transmits a downlink frame j to the UE, and records transmission time as $t_2$. Next, the UE receives downlink frame j and records the time of arrival of the first detected path as $t_4$. The following calculations are performed in the UE and gNB, respectively: i) $UE_{Rx-Tx}diff=t_4-t_1$; and ii) $gNB_{Rx-Tx}$ $diff=t_3-t_2$. This quantity can be positive or negative depending on the whether gNB transmits the DL frame before or after receiving the UL frame. The propagation delay can be calculated as follows: RTT=(gNB Rx−Tx time difference)+(UE Rx−Tx time difference).

Figure 2:
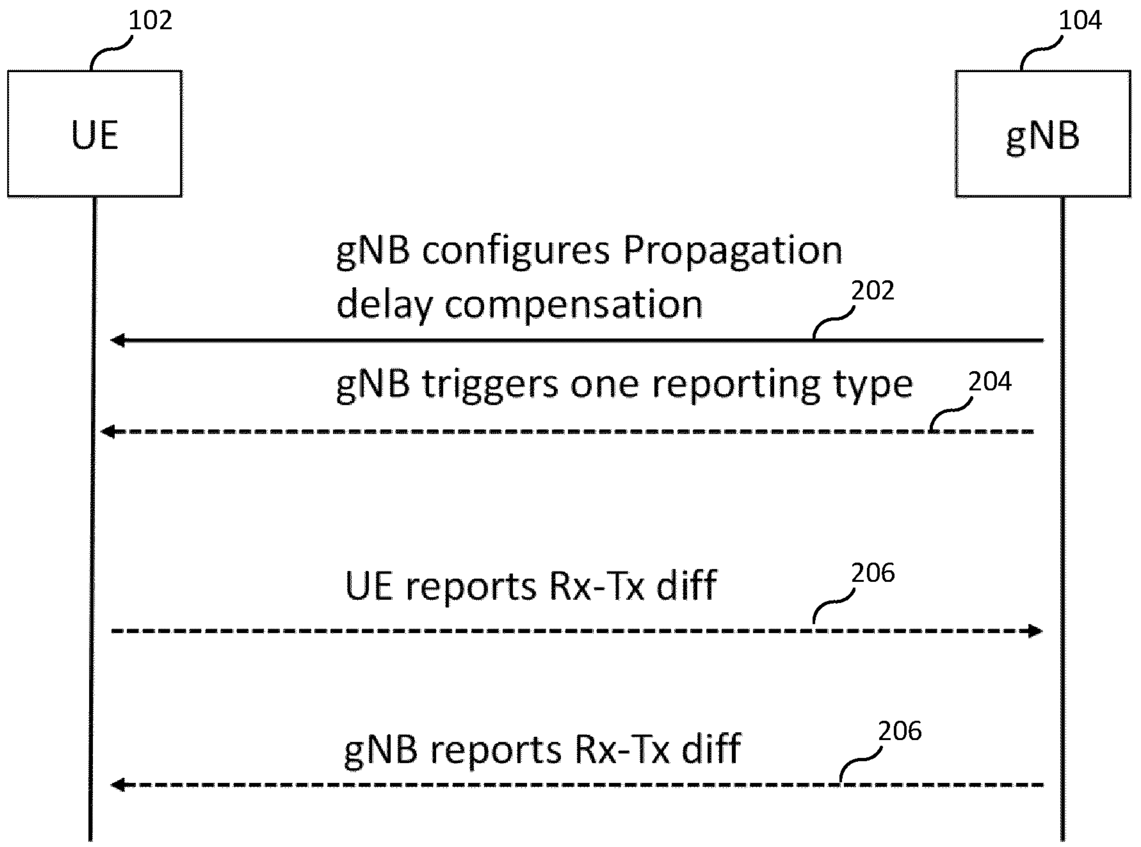
FIG. 2 is a message flow diagram according to an embodiment.

FIG. 2 is a message flow diagram illustrating signaling between UE 102 and gNB 104 for time synchronization.

In one embodiment, gNB uses a message 202 (e.g., an RRC message) to configure UE 102 with information identifying the reference signals to be used for the RTT-based measurement and the measurement reporting configurations. After sending message 202, gNB may trigger the UE to perform the RTT-based measurements and transmit a report by transmitting to UE 102 a trigger message 204 (e.g., Downlink Control Information (DCI) or MAC Control Element (CE)). In the below example, the uplink reference signals are Sounding Reference Signals (SRS) and the downlink reference signals are Channel State Information Reference Signals (CSI-RS). Other reference signals can also be used.

The reporting can be periodic after receiving the RRC configuration message 202. The reporting can also be semi-periodic after receiving the RRC configuration message 202 in such a case a durationForSemiPeriodic is configured so that UE stops reporting after the configured time durationForSemiPeriodic. The durationForSemiPeriodic can also take a value of infinity. The reporting can also be aperiodic and triggered by Downlink Control Information (DCI).

UE can either send the reporting in an UL MAC CE or in an RRC message. As multiple reporting configurations are configured, gNB can configure UE on which one or multiple ones to be used through trigger message 204 (e.g., DCI or MAC CE signaling), which also serves as the triggering mechanism for the UE to start reporting. If only one is configured, then it is the default one to be used.

1. UE Reports UE Rx−Tx Time Difference to gNB

In this embodiment, UE reports UE Rx−Tx time difference to gNB on the Uu interface (see report 206).

In the reporting configurations, gNB can configure UE to send the average of a configurable number of consecutive measurements instead of each measurement. This is indicated by, for example, the parameter measAveragingFactor. The purpose of this is to reduce the uplink reporting overhead. A measAverageFactor of 5 allows UE to average 5 measurements and thus, reduce the overhead five-fold.

In another embodiment, gNB can configure UE to apply a layer-3 filtering of the measurements before reporting, for example with a moving average window with different weights. For example, gNB configure an index of length 10=[0.2, 0.4, 0.6, 0.8, 1, 1, 1, 1, 1, 1] where each value represents the weight of the measurement in the final reporting. At time t when reporting, the weight is 0.2 at t−10, the weight is 0.4 at t−9, the weight is 0.6 at t−8, etc. In another example, UE uses the formula to report the value of $F_n=(1-\alpha)*F_{n-1}+a*M_n$ and $M_n$ is the measurement at time n and a is the weighting factor.

In another embodiment, UE is configured to report periodically every t, t+5, t+10, etc. in which the reporting periodicity is every 5 ms which is different and larger than the periodicity of the periodic occurrences of the reference signals.

Below is an example of an IE to configure RTT request:

```
-- ASN1START
RTT-RequstId   ::= Integer(1..maxNrOf-RTT-Request)
RTT-Request-PeriodicToAddModList ::= SEQUENCE {SIZE (1..maxNrOf-RTT-Request)}
of RTT-RequestId
RTT-Request-SemiPeriodicToAddModList ::= SEQUENCE {SIZE (1..maxNrOf-RTT-
Request)} of RTT-RequestId
RTT-Request-aPeriodicToAddModList ::= SEQUENCE {SIZE (1..maxNrOf-RTT-Request)}
of RTT-RequestId
RTT-Request ::= SEQUENCE {
  rtt-RequestId      RTT-RequstId
  srs-resourceId      SRS-ResourceId,
  nzp-CSI-RS-ResourceId  NZP-CSI-RS-ResourceId,
  rtt-ReportConfig     RTT-ReportConfigId
  ...
}
RTT-ReportConfig ::= SEQUENCE {
  rtt-ReportConfigId     RTT-ReportConfigId
  reportingType       ENUMERATED{aperiodic, periodic, semi-periodic}
  reportingFrequency     ENUMERATED{ms1, ms5, ms10, ms20, ..}     OPTIONAL
  durationForSemiPeriodic  ENUMERATED{ms1, ms5, ms10, ms20, ..}     OPTIONAL
  measAveragingFactor    INTEGER (1..10)      OPTIONAL   -- Need ON
}
-- ASN1STOP
```

In the above, network can configure one RTT-request with a pair of DL and UL references signals to use for RTT measurement. This is linked to one report configuration. The network can configure a list of multiple such requests. Multiple pairs of DL and UL reference signals can be linked to one report configuration and multiple report configurations can be linked to one pair of DL and UL reference signals.

For semi-periodic reporting type, the network can activate/de-active any one by using a MAC CE. For aperiodic reporting type, it is triggered by a pointer in the DCI field.

In the uplink reporting of UE Rx−Tx, UE can report the measurement in the RRC message. It is a list of measurements ordered by the time the measurements are taken, if timestamp is absent. Optionally, timeStamp can be added. The measurement element points to the specific RTT request ID which subsequently identify which pair of DL and UL signals have been used and the reporting configurations.

```
UE-RTT-MeasList ::= SEQUENCE (SIZE(1..MaxUERTTReport)) OF
UE-RTT-
MeasElement
UE-RTT-MeasElement ::= SEQUENCE {
  rtt-RequstId       RTT-RequestId
  UE-RxTxTimeDiff       CHOICE {
    k0               INTEGER (0..1970049),
    k1               INTEGER (0..985025),
    k2               INTEGER (0..492513),
    k3               INTEGER (0..246257),
    k4               INTEGER (0..123129),
    k5               INTEGER (0..61565),
    ...
  },
  DL-PRS-RSRP-Result   INTEGER (0..126)        OPTIONAL,
  timeStamp        TimeStamp
}
```

Note that the variable names above are exemplary, and other names can be used without changing the functionality of the signaling. For instance, release suffix can be attached to a parameter name, e.g., 'dl-PRS-ID-r16' or 'dl-PRS-ID-r17'.

In another embodiment, the UE Rx−TX time difference can be reported in the UL MAC CE.

2. gNB Node Reports gNB Rx−Tx Time Difference to UE

In this reporting configuration, gNB sends the measurement results of gNB Rx−Tx time difference to UE (see report 208). While the reporting does not involve a location server, the same reporting mapping tables (for example, gNB Rx−Tx time difference measurement report mapping table, UL SRS RSRP report mapping) defined for positioning can be reused for time synchronization purpose between gNB and UE (for instance, propagation time estimation). The reporting IE is illustrated below:

```
GNB-RTT-MeasList ::= SEQUENCE (SIZE(1.. MaxGNBRTTReport))
```

-continued

```
OF GNB-RTT-
MeasElement
GNB-RTT-MeasElement ::= SEQUENCE {
  rtt-RequestId          RTT-RequestId
  GNB-RxTxTimeDiff       CHOICE {
    k0                        INTEGER (0..1970049),
    k1                        INTEGER (0..985025),
    k2                        INTEGER (0..492513),
    k3                        INTEGER (0..246257),
    k4                        INTEGER (0..123129),
    k5                        INTEGER (0..61565),
    ...
  },
  UL-SRS-RSRP-Result   INTEGER (0..126)          OPTIONAL,
  timeStamp          TimeStamp
}
```

In one embodiment, a different set of reporting mapping tables (for example, gNB Rx−Tx time difference measurement report mapping table, UL SRS RSRP report mapping) can be defined for time synchronization purpose between gNB and UE. In another embodiment, the gNB measurement results are sent to UE via MAC CE(s).

3. Dependencies of Achievable Time Synchronization Accuracy

The granularity of achievable RTT based time synchronization accuracy may depend on various parameters and configurations. In one example, the accuracy achievable is a function of the downlink subcarrier spacing (SCS) of the active Bandwidth Part (BWP), and/or uplink SCS of the active BWP. In another example, the granularity achievable of the RTT method depends on the k value (i.e., k=0 to 5) used to determine the gNB Rx−Tx time difference measurement report mapping.

In another example, a k value (i.e., k=0 to 5) is introduced to determine the UE Rx−Tx time difference measurement report mapping table. Then, the granularity achievable of the RTT method depends on the k value of the UE Rx−Tx time difference measurement report mapping.

In another example, the time synchronization accuracy is negotiated between gNB and UE using the k value defined for Rx−Tx time difference reporting. With possible value {0,1,2,3,4,5} for k, k=0 corresponds to finest granularity, and k=5 corresponds to coarsest granularity. The granularity level can be negotiated between UE and gNB.

For instance, the gNB can signal the desired granularity level k to UE. The UE can reply with the actually realized k to the gNB, which may or may not be equal to the desired k from gNB.

For instance, the UE can signal the desired granularity level k to gNB. This k value depending on the synchronization accuracy requirement at the application layer (e.g., part of the information in the time sensitive networking (TSN) configuration). The gNB can reply with the actually realized k to the UE, which may or may not be equal to the desired k from UE. In this approach, UE can request one or more than one k values and gNB can rely none of them can be supported.

In another approach, no negotiation is allowed. For instance, gNB selects one k value based on UE capability, the SCS of the current activated BWPs, and the available remaining reference signal resources in the cell and etc. In other words, this is a configuration from the gNB.

Figure 3:
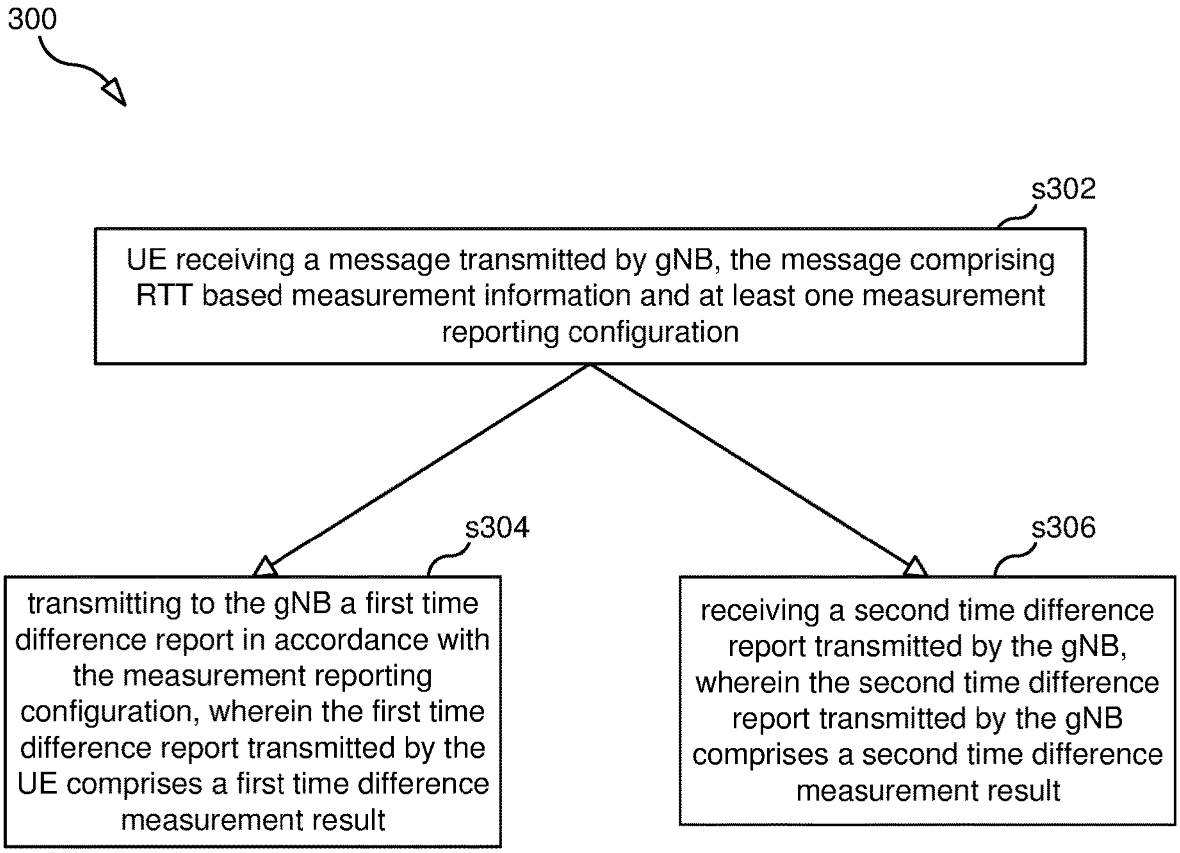
FIG. 3 is a flowchart illustrating a process according to some embodiments.

FIG. 3 is a flowchart illustrating a process 300 performed by UE 102. Process 300 may begin in step s302. Step s302 comprises UE 102 receiving a message transmitted by base station 104. The message comprises RTT based measurement information and at least one measurement reporting configuration. After receiving message 202, the UE performs at least one of step s304 or step s306. Step s304 comprises UE 102 transmitting to the base station a first time difference report in accordance with the measurement reporting configuration, wherein the first time difference report transmitted by the UE comprises a first time difference measurement result. Step s306 comprises UE 102 receiving a second time difference report transmitted by the base station, wherein the second time difference report transmitted by the base station comprises a second time difference measurement result.

Figure 4:
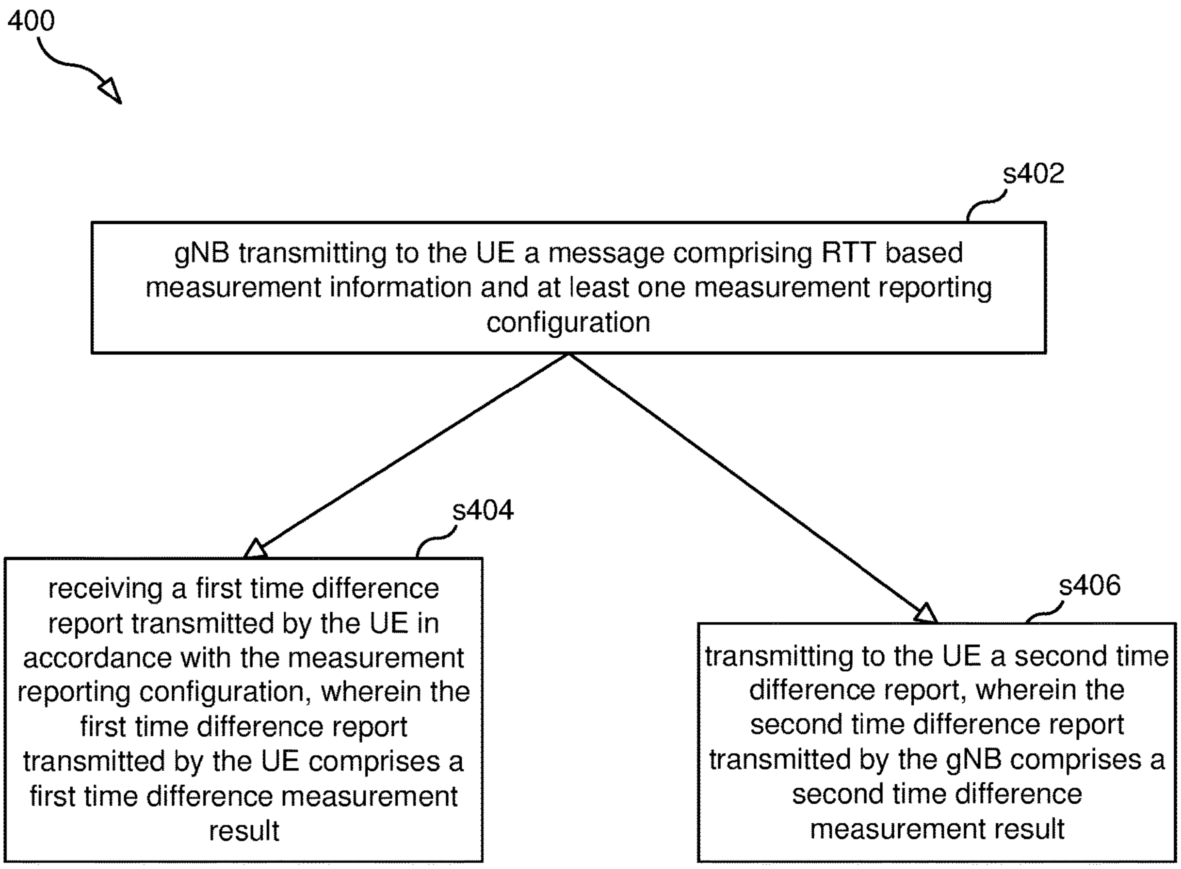
FIG. 4 is a flowchart illustrating a process according to some embodiments.

FIG. 4 is a flowchart illustrating a process 400 performed by base station 104. Process 400 may begin in step s402. Step s402 comprises the base station transmitting to UE 102 a message comprising RTT based measurement information and at least one measurement reporting configuration. After performing step s402, base station 104 performs at least one of step s404 or step s406. Step s404 comprises base station 104 receiving a first time difference report transmitted by the UE in accordance with the measurement reporting configuration, wherein the first time difference report transmitted by the UE comprises a first time difference measurement result. Step s406 comprises base station 104 transmitting to the UE a second time difference report, wherein the second time difference report transmitted by the base station comprises a second time difference measurement result.

In some embodiments, the RTT based measurement information comprising information identifying reference signals to be used for one or more RTT-based measurements.

In some embodiments, the first time difference report comprises an Rx−Tx time difference calculated by the UE (i.e., a time difference between the time at which the UE performs a transmission to the base station (e.g., transmits a frame to the base station) and the time at which the UE receives a transmission from the base station (e.g., receives a frame transmitted by the base station)).

In some embodiments, the first time difference report comprises an average value representing the average of a number of Rx−Tx time differences calculated by the UE.

In some embodiments, the first time difference report comprises a filtered Rx−Tx time difference calculated by the UE.

In some embodiments, the UE generated the filtered Rx−Tx time difference using a moving average window.

In some embodiments, the RTT based measurement information comprises: an SRS resource identifier identifying an SRS resource configuration (e.g., a configuration that identifies a frequency band, a number of SRS ports, and a resource mapping); and a CSI-RS resource identifier identifying a CSI-RS resource configuration. In some embodiments, the RTT based measurement information comprises a reporting configuration identifier that identifies the measurement reporting configuration.

In some embodiments, the measurement reporting configuration comprises one or more of: report type information identifying a reporting type; reporting frequency information identifying a reporting frequency; a duration value; or a measurement averaging factor.

In some embodiment, process 300 further includes the UE, after receiving message 202, receiving a trigger message 204 for triggering the UE to start RTT-based measurements using the RTT based measurement information included in the message 202.

In some embodiment, process 400 further includes the base station 104, after transmitting message 202, transmitting to the UE a trigger message 204 for triggering the UE to start RTT-based measurements using the RTT based measurement information included in the message 202.

In some embodiments, the trigger message identifies a reporting configuration to be used by the UE for reporting the RTT-based measurements. In some embodiments, the trigger message is Downlink Control Information, DCI, or a MAC control element, CE.

Figure 5:
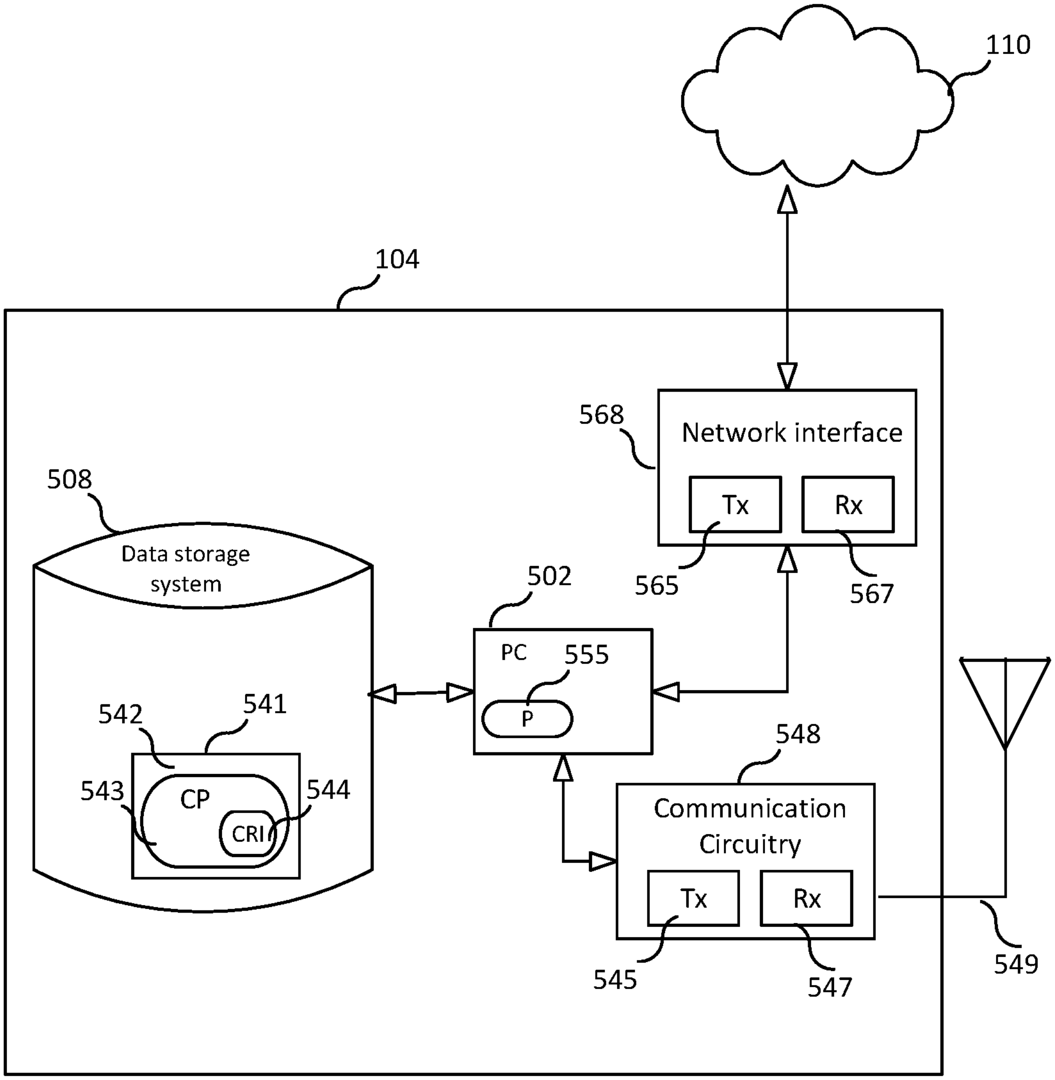
FIG. 5 illustrates a network node according to some embodiments.

FIG. 5 is a block diagram of network node 104, according to some embodiments, for performing network node methods disclosed herein. As shown in FIG. 5, network node 104 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 104 may be a distributed computing apparatus); at least one network interface 568 comprising a transmitter (Tx) 565 and a receiver (Rx) 567 for enabling network node 104 to transmit data to and receive data from other nodes connected to a network 110 (e.g., an Internet Protocol (IP) network) to which network interface 568 is connected; communication circuitry 548, which is coupled to an antenna arrangement 549 comprising one or more antennas and which comprises a transmitter (Tx) 545 and a receiver (Rx) 547 for enabling network node 104 to transmit data and receive data (e.g., wirelessly transmit/receive data); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes network node 104 to perform steps described herein (e.g., steps described herein with reference to the flow charts). In other embodiments, network node 104 may be configured to perform steps described herein without the need for code. That is, for example, PC 502 may consist merely of one or more ASICs. Hence, the features of the embodiments described herein may be implemented in hardware and/or software.

Figure 6:
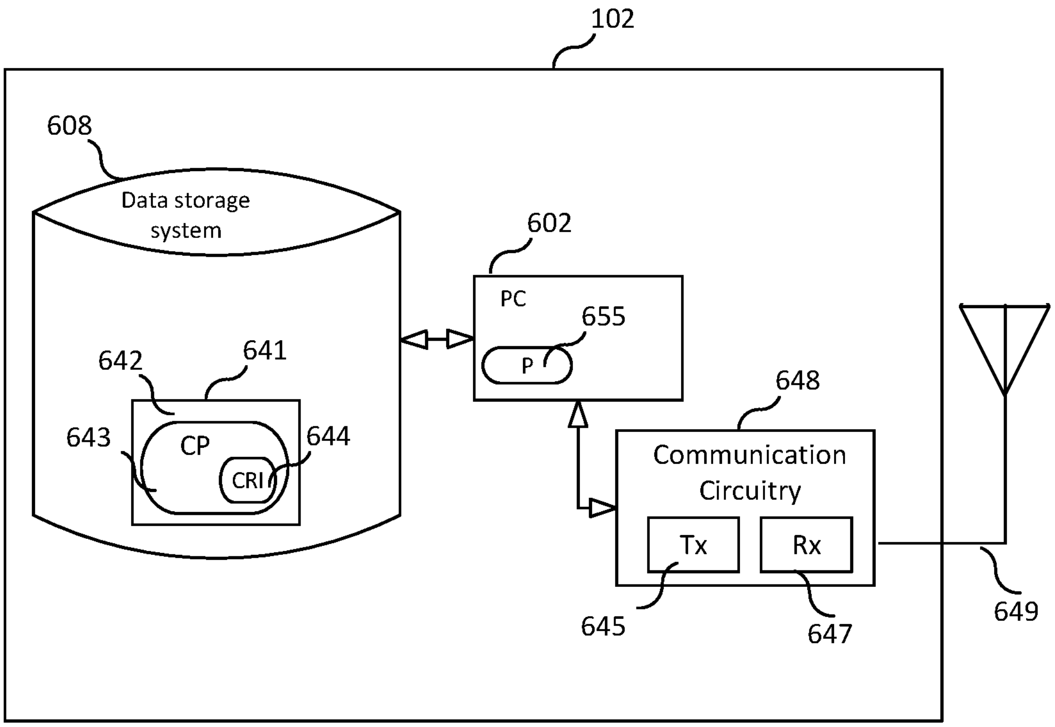
FIG. 6 illustrates a UE according to some embodiments.

FIG. 6 is a block diagram of UE 102, according to some embodiments. As shown in FIG. 6, UE 102 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 102 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 102 to perform steps described herein (e.g., steps described herein with reference to the flow charts). In other embodiments, UE 102 may be configured to perform steps described herein without the need for code. That is, for example, PC 602 may consist merely of one or more ASICs. Hence, the features of the embodiments described herein may be implemented in hardware and/or software.

Summary of Various Embodiments

A1. A method (300) performed by a user equipment, UE (102), the method comprising: the UE receiving (s302) a message (202) transmitted by a base station (104), the message comprising round-trip-time, RTT, based measurement information and at least one measurement reporting configuration; and the UE performing at least one of: i) transmitting (s304) to the base station a first time difference report in accordance with the measurement reporting configuration, wherein the first time difference report transmitted by the UE comprises a first time difference measurement result, or ii) receiving (s306) a second time difference report transmitted by the base station, wherein the second time difference report transmitted by the base station comprises a second time difference measurement result.

A2. A method (400) performed by a base station (104), the method comprising: the base station transmitting (s402) to a user equipment, UE (102), a message (202) comprising round-trip-time, RTT, based measurement information and at least one measurement reporting configuration; and the base station performing at least one of: i) receiving (s404) a first time difference report transmitted by the UE in accordance with the measurement reporting configuration, wherein the first time difference report transmitted by the UE comprises a first time difference measurement result, or ii) transmitting (s406) to the UE a second time difference report, wherein the second time difference report transmitted by the base station comprises a second time difference measurement result.

A3. The method of claim A1 or A2, wherein the RTT based measurement information comprising information identifying reference signals to be used for one or more RTT-based measurements.

A4. The method of any one of claims A1-A3, wherein the first time difference report comprises a time difference calculated by the UE, wherein the time difference is a time difference between the time at which the UE performs a transmission to the base station and the time at which the UE receives a transmission from the base station.

A5. The method of any one of claims A1-A4, wherein the first time difference report comprises an average value representing the average of a set of time differences calculated by the UE.

A6. The method of any one of claims A1-A4, wherein the first time difference report comprises a filtered time difference calculated by the UE.

A7. The method of claim A6, wherein the UE generated the filtered time difference using a moving average window.

A8. The method of any one of claims A1-A7, wherein the RTT based measurement information comprises: an SRS resource identifier identifying an SRS resource configuration (e.g., a configuration that identifies a frequency band, a number of SRS ports, and a resource mapping); and a CSI-RS resource identifier identifying a CSI-RS resource configuration.

A9. The method of claim A8, wherein the RTT based measurement information comprises a reporting configuration identifier that identifies the measurement reporting configuration.

A10. The method of any one of claims A1-A9, wherein the measurement reporting configuration comprises one or more of: report type information identifying a reporting type; reporting frequency information identifying a reporting frequency; a duration value; or a measurement averaging factor.

A11. The method of any one of claims A1 or A3-A10, further comprising: the UE, after receiving the message (202), receiving a trigger message (204) for triggering the UE to start RTT-based measurements using the RTT based measurement information included in the message (202).

A12. The method of any one of claims A2-A11, further comprising: the base station, after transmitting the message (202), transmitting to the UE a trigger message (204) for triggering the UE to start RTT-based measurements using the RTT based measurement information included in the message (202).

A13. The method of claim A11 or A12, wherein the trigger message identifies a reporting configuration to be used by the UE for reporting the RTT-based measurements.

A14. The method of any one of claims A11-A13, wherein the trigger message is Downlink Control Information, DCI, or a MAC control element, CE.

B1. A computer program (643) comprising instructions (644) which when executed by processing circuitry (602) of a user equipment, UE (102) causes the UE (102) to perform the method of any one of claims A1 or A3-A14.

B2. A computer program (543) comprising instructions (544) which when executed by processing circuitry (502) of a base station (104) causes the base station (104) to perform the method of any one of claims A2-A14.

B3. A carrier containing the computer program of claim B1 or B2, wherein the carrier is one of an electronic signal, an optical signal, a radio signal, and a computer readable storage medium (542, 1842).

C1. A user equipment, UE (102), the UE (102) being adapted to perform the method of any one of claims A1 or A3-A14.

C2. A user equipment, UE (102), the UE (102) comprising: processing circuitry (602); and a memory (642), the memory containing instructions (644) executable by the processing circuitry, whereby the UE is operative to perform the method of any one of the claims A1 or A3-A14.

D1. A base station (104), the base station (104) being adapted to perform the method of any one of the claims A2-A14.

D2. A base station (104), the base station (104) comprising: processing circuitry (502); and a memory (542), the memory containing instructions (544) executable by the processing circuitry, whereby the base station is operative to perform the method of any one of the claims A2-A14.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:

receiving a Radio Resource Control (RRC) configuration message transmitted by a network node, the RRC message comprising:

a) a round-trip-time (RTT) request information element (IE) comprising:

i) an RTT request identifier (ID);

ii) reference signal (RS) information identifying one or more RSs to be used for a RTT-based measurement; and iii) a report configuration ID identifying a measurement reporting configuration; and b) the measurement reporting configuration identified by the report configuration ID included in the RTT request IE, wherein the measurement reporting configuration comprises: the report configuration ID and a report type value identifying a reporting type;

after receiving the RRC message, receiving downlink control information (DCI) transmitted by the network node, wherein the DCI is for triggering the UE to perform the RTT-based measurement; and in direct response to receiving the DCI for triggering the UE to perform the RTT-based measurement, the UE performing a process comprising:

determining a first time difference measurement result;

receiving a second time difference report transmitted by the network node, wherein the second time difference report transmitted by the network node comprises a second time difference measurement result; and calculating a propagation delay based on the first and the second time difference measurement result, wherein determining the first time difference measurement result comprises calculating a time difference ($\Delta t_{UE}$) between a time at which the UE transmits an uplink frame to the network node and a time at which the UE receives a downlink frame transmitted by the network node, the second time difference measurement result is, or is based on, a time difference ($\Delta t_{BS}$) between the time at which the network node transmits the downlink frame to the UE and the time at which the network node receives the uplink frame that was transmitted by the UE, and the propagation delay is calculated as $t_{UE}+\Delta t_{BS}$, where $t_{UE}$ is equal to $\Delta t_{UE}$ or is calculated using $\Delta t_{UE}$, wherein the time at which the UE transmits the uplink frame to the network node is t1, the time at which the network node transmits the downlink frame to the UE is t2, the time at which the network node receives the uplink frame is t3, the time at which the UE receives the downlink frame that was transmitted by the network node is t4, t4 is later than t1, $\Delta t_{UE}$ is equal to t4-t1, and $\Delta t_{BS}$ is equal to t3-t2.

2. The method of claim 1, wherein the network node is a base station.

3. The method of claim 1, wherein the first time difference measurement result is an average value representing the average of a set of time differences calculated by the UE.

4. The method of claim 1, wherein the RS information identifying one or more RSs to be used for the RTT-based measurement comprises:

an SRS resource identifier identifying an SRS resource configuration; and/or a CSI-RS resource identifier identifying a CSI-RS resource configuration.

5. The method of claim 1, wherein the measurement reporting configuration further comprises:

reporting frequency information identifying a reporting frequency;

a duration value; and/or a measurement averaging factor.

6. The method of claim 1, wherein the DCI comprises the report configuration ID.

7. The method of claim 1, wherein the network node transmits the downlink frame to the UE before receiving the uplink frame transmitted by the UE.

8. The method of claim 1, wherein $t_{UE}$ is greater than 0, and $\Delta t_{BS}$ is greater than 0.

9. A method performed by a network node, the method comprising:

transmitting to a user equipment (UE) a Radio Resource Control (RRC) configuration message comprising:

a round-trip-time (RTT) request information element (IE) comprising:

i) an RTT request identifier (ID);

ii) reference signal (RS) information identifying one or more RSs to be used for a RTT-based measurement; and iii) a report configuration ID identifying a measurement reporting configuration; and the measurement reporting configuration identified by the report configuration ID included in the RTT request IE, wherein the measurement reporting configuration comprises: the report configuration ID and a report type value identifying a reporting type;

after transmitting the RRC message, transmitting to the UE downlink control information (DCI) for triggering the UE to perform the RTT-based measurement; and the network node performing a process comprising:

receiving a first time difference report transmitted by the UE in accordance with the measurement reporting configuration, wherein the first time difference report transmitted by the UE comprises a first time difference measurement result ($t_{UE}$);

determining a second time difference measurement result, the second time difference measurement result is, or is based on, a time difference ($\Delta t_{BS}$) between the time at which the network node receives an uplink frame transmitted by the UE and the time at which the network node transmits a downlink frame to the UE; and calculating a propagation delay based on the first and the second time difference measurement result, wherein the propagation delay is calculated as $t_{UE}+\Delta t_{BS}$, where $t_{UE}$ is equal to $\Delta t_{UE}$ or is calculated using $\Delta t_{UE}$, $\Delta t_{UE}$ is equal to a time difference between a time at which the UE transmits the uplink frame to the network node and a time at which the UE receives the downlink frame, the time at which the UE transmits the uplink frame to the network node is t1, the time at which the network node transmits the downlink frame to the UE is t2, the time at which the network node receives the uplink frame is t3, the time at which the UE receives the downlink frame that was transmitted by the network node is t4, t4 is later than t1, $\Delta t_{UE}$ is equal to t4-t1, and $\Delta t_{BS}$ is equal to t3-t2.

10. The method of claim 9, wherein the DCI comprises the report configuration ID.

11. A user equipment (UE), the UE comprising:

processing circuitry; and a memory, the memory containing instructions executable by the processing circuitry, wherein the UE is operative to perform the method of claim 1.

12. A network node, the network node comprising:

processing circuitry; and a memory, the memory containing instructions executable by the processing circuitry, wherein the network node is operative to perform the method of claim 9.

* * * * *